2 Sheets—Sheet 1.
S. W. WOOD.
GRAIN CONVEYING MACHINE.
No. 65,149.                    Patented May 28, 1867.
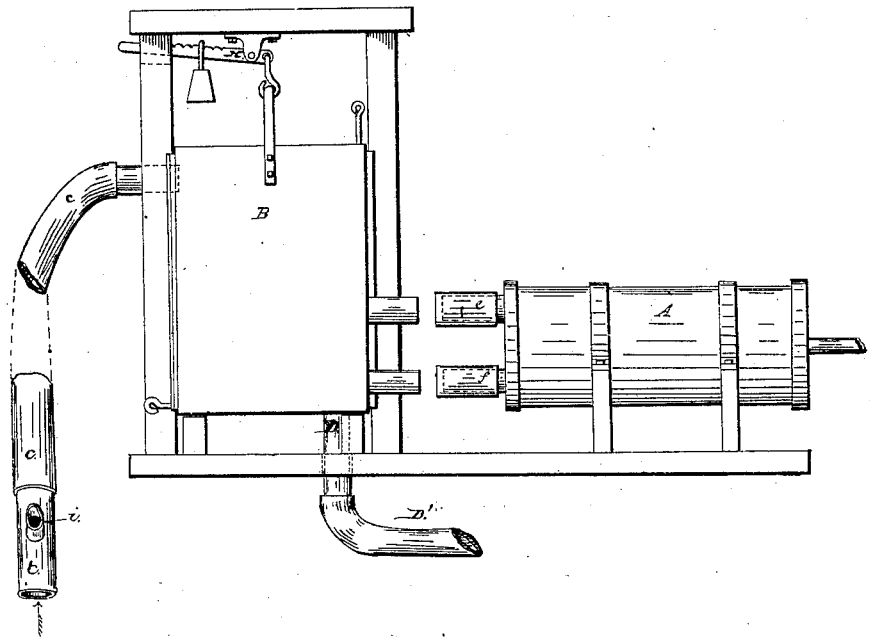
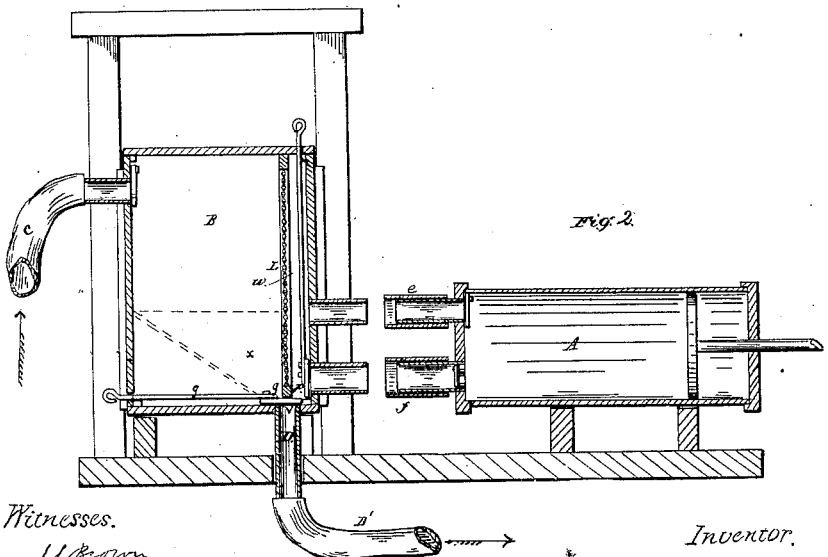

2 Sheets—Sheet 2.
S. W. WOOD.
GRAIN CONVEYING MACHINE.
No. 65,149. Patented May 28, 1867.
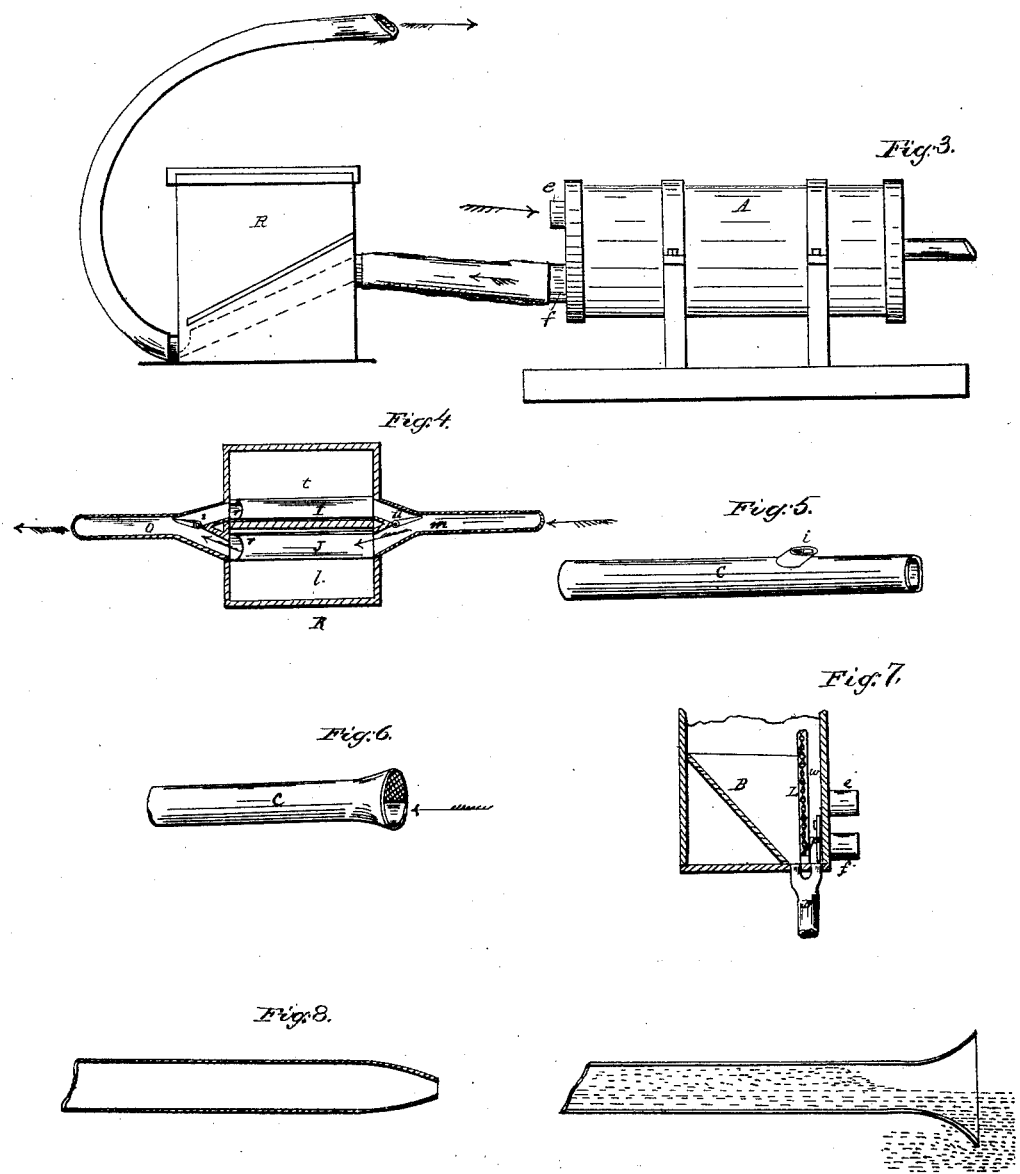

United States Patent Office.

S. W. WOOD, OF CORNWALL, NEW YORK.

Letters Patent No. 65,149, dated May 28, 1867.

---

IMPROVEMENT IN GRAIN-CONVEYING MACHINES.

---

The Schedule referred to in these Letters Patent and making part of the same.

---

TO ALL WHOM IT MAY CONCERN:

Be it known that I, S. W. WOOD, of Cornwall, county of Orange, and State of New York, have invented new and useful improvements in Apparatus for Conveying and Weighing Grain; and I hereby declare that the following is a full, clear, and exact description thereof, reference being had to the annexed drawings, making part of this specification, in which—

Figure 1 represents a side elevation of a pump-reservoir and scales or weighing apparatus, with conveying hose or pipes for conveying grain to and from said chamber or scales.

Figure 2 is a vertical longitudinal section of the same, showing the interior arrangements.

Figure 3 is a side elevation of a pump, or its equivalent, and a reservoir, in connection with scales or weighing apparatus, if desired, for the introduction of grain into a pipe or passage, conveying compressed or forced air.

Figure 4 is a horizontal section of the reservoir, fig. 3, which also may include scales or weighing apparatus, divided so that while the grain is being forced from one compartment through a hose or pipe, the opposite compartment may be filled or filling, by which means grain may be carried continuously through the conveying or delivery pipe.

Figure 5 is a perspective view of one means of introducing a current of air independent of the opening or passage by which the grain is introduced into the receiving pipe.

Figure 6 is another method of effecting the same purpose.

Figure 7 is a vertical section of a modified construction of the reservoir B, figs. 1, 2.

Figures 8 and 9, views of modifications of the conveying and receiving pipes.

Like letters indicate similar parts in all the figures.

Let A, in the annexed drawings, represent an air-pump constructed and arranged in connection with a reservoir, B, scales or weighing apparatus H, and conveying hose or pipes C D, so that a partial vacuum may be formed in the reservoir B, by exhausting the air therefrom, to fill it with grain through the pipes C and, after being weighed, to allow the grain to pass out therefrom, through the conveying pipe D of its own gravity, or expelled by compressed air from the pump. To fill the reservoir B with grain, the pump A is connected therewith by means of a sliding exhaust pipe, $e$, or its equivalent, so as to produce sufficient vacuum therein to lift and bring the grain through the receiving hose or pipe C, allowing the air exhausted from the reservoir B to escape through a pipe, $f$, opened or disconnected; but which, when connected, leads back from the air-pump A into the reservoir B. While the reservoir B is being filled with grain, valves $g\,p$ are closed, so as to shut the pipe $f$ and the passage into the conveying pipe D, leaving communication only through the pipe $e$. When it is desired to empty the reservoir B, and to convey the grain after being weighed therein, if desired, to another place, the exhaust pipe $e$ is disconnected from, and the compressing pipe $f$ connected with, the reservoir B. The valves $g\,p$ are then opened, and the grain forced out through the conveying hose or pipe D, by compressed air from the pump A, the pump being supplied with air through the disconnected pipe $e$, or the grain may be allowed to pass out of the reservoir through the conveying pipe D of its own gravity.

To allow a free passage of the air, and at the same time to prevent the grain from passing into the pump through the exhaust pipe $e$, while the reservoir is being filled, by causing a partial vacuum therein, a sieve or perforated partition, L, is arranged (in this instance at one side) in the reservoir, which allows air to pass freely through it, but retains the grain by itself, leaving a space or chamber, $w$, between the pump and the grain. With this sieve, perforated partition, or its equivalent, separating the grain from the air-pump A, the reservoir may be filled by a continuous partial exhaustion of the air therein, and the grain discharged therefrom at pleasure by compressed air.

To convey grain from the reservoir B through a hose or conveying pipe, D, the throat $r$ is divided by the perforated or sieve partition L, part of the pipe opening into the air-space $w$, and part opening into the grain-compartment $x$, by which arrangement a separate current of air is constantly passing into the pipe or hose D, simultaneously with the grain, and thus distributes the grain equally through the pipe D, and carries or conveys it continuously through said pipe. This introduction of a separate or independent current of air into the conveying pipe to commingle with the grain is of essential importance, since it is necessary to convey a proportionally large bulk of air through the pipe with the grain, in order to sufficiently lighten the passing stream or current of commingled air and grain, and diminish the pressure required to convey the same. Ordinarily, sufficient air cannot enter in the interstices of the grain for the purpose, and consequently the passage is stopped, being choked by the grain, and the apparatus would become inoperative. And the greater the height or distance to which the grain is to be conveyed, or the less the pressure of air at command, the greater the proportion of air required to commingle with the grain. Hence it may be desirable to regulate or adjust the size of the independent air or induction opening, in order to vary the amount of air introduced with the grain, under such varying circumstances. The pressure of air behind the grain forces the same into the pipe D from the reservoir, and a quantity of air enters with the grain, but, as before stated, ordinarily not sufficient for conveying the grain.

A possible but very imperfect modification of the means of applying this principle of reducing the proportional amount of grain to be introduced into the pipe with the air is indicated in fig. 8, and consists in contracting the nozzle or induction opening of the pipe, as compared in size with the main part thereof, thereby limiting the quantity of grain that can be forced into the pipe. But this is very deficient, practically, since not enough air can enter with the grain to work the pipe to its full capacity. Instead of dividing the throat $r$ of the pipe D, as shown in fig. 2, the said pipe may be branched, as shown in fig. 7, one branch leading into the grain-compartment $x$, and one branch leading into the air-chamber $w$. The air-branch may be connected directly with the condensing pipe $f$ of the air-pump A, if preferred. This same principle applies in lifting the grain and causing it to pass into and through the exhaust hose or pipe C, and one method of adapting it practically is to form an opening, $i$, at or near the end, (fig. 5,) which receives the grain. This opening admits an independent, continuous current of air into the pipe or hose with the grain, distributing it equally therewith, and enabling it to convey the same into the reservoir B continuously. Or air may be admitted into the receiving pipe or hose C, at the end or opening which admits the grain, by covering a portion thereof with a perforated plate or sieve, as represented in fig. 6. Or the principle may be imperfectly applied even without the perforated plate, by taking care only partially to immerse the nozzle or opening in the grain, so as to allow a free passage to air above the same. With the ordinary shape of nozzle this is hardly practicable, but by employing a bell-shaped, flaring, or equivalent enlargement of the nozzle or opening, as indicated in fig. 6, this method may be practicable under some circumstances, though imperfect, as compared with the method first described.

An important desideratum in the use of my invention is to introduce grain into a conveying pipe or passage, through which the air is being forced, at any required distance from the pump, or equivalent, which forces the air through the same. I accomplish this purpose by one method, as follows:

Figs. 3 and 4 represent a reservoir, R, (including scales or other weighing apparatus, if desired,) for receiving grain, divided into two compartments, and connected with a conveying hose or pipe, through which air is forced. The pipe divides from the air, conveying portion $m$ into two branches, I and J, which extend, respectively, through or under the compartments $t\ l$ of the reservoir, and then unite again into one grain-conveying portion $o$. These branches are provided with shifting-valves $s\ u$, so that while the grain is being admitted into the pipe from one compartment, the opposite compartment may be filled or filling with grain, in any convenient manner.

The grain is admitted from the compartments $t\ l$ into the branch pipes I J, respectively, through openings $r\ r$ in said branch pipes, and there commingling with the air, is immediately conveyed into the grain-conveying portion $o$ of the pipe, to be distributed and carried through the same continuously. This reservoir may be placed at any desired point to receive grain, between where the air is supplied and where the grain makes its exit. It may be varied in its construction in many ways, and provided with perforated partitions or sieves, if deemed advisable; but I have represented here only one form of construction as sufficient to illustrate my invention.

Double reservoirs and double scales, or weighing apparatus, may be arranged, and the connecting pipes $e\ f$ so constructed as to be shifted simultaneously into each reservoir, so that while one reservoir is being filled with grain, the other may be discharging, making the movement of the grain continuous.

A modification of or substitute for the perforated partition or screen L, in the reservoir B, may be employed, by conveying the air from the reservoir to the pump A, through or by a passage located high enough above, or so shielded from the point where the receiving pipe $c$ discharges into the reservoir as to insure the falling of the grain below, and not to allow the grain to enter the exhaust passage. In this case the reservoir may be somewhat higher than with a perforated partition, L, and the chamber $w$ may have the whole width of the reservoir, or be narrowed to a mere pipe, or equivalent passage for the air. And the condensed-air passage from the pump to the conveying pipe D may be separated from, or communicate with, said exhaust passage.

Various arrangements may be made for screening grain, and attached to this apparatus; and grain may be screened in its passage through either or both of the conveying pipes C D, if desired. Self-acting and shifting valves, of any construction, may be employed, if preferred, to change the reservoir from a partial vacuum chamber to a compressed-air chamber.

In the use of my invention it is essential that the receiving pipe should be adjustable to different positions readily, and thus be able to take up the grain from any location required, while the apparatus continues in operation. To this end I make the receiving pipe C flexible, say of India rubber or leather, as represented. Or the pipe might be jointed, to effect the same purpose, though imperfectly. The same requisite is true of the conveying pipe D, though not so essential, in order that the grain may be conveyed to any place required. And I make the pipes flexible or jointed, so as to be adjustable or movable in position.

This invention is applicable to the purpose of conveying other finely divided material as well as grain.

Having thus, as I believe, fully described my improved apparatus for conveying grain, what I claim as my invention, and desire to secure by Letters Patent, is—

A reservoir, B, and weighing apparatus, or scales, H, in combination with the receiving and conveying pipes or passages C D, air-pump A, and the governing valves, constructed and arranged to operate substantially as and for the purposes herein specified.

I also claim the perforated partition or screen L, in combination with the reservoir B, receiving and conveying pipes C D, air-pump A, and valves, substantially as and for the purpose herein set forth.

I also claim the devices, or their equivalents, for the introduction of air into the receiving and conveying pipes C D, in addition to that introduced with the grain, substantially as and for the purpose specified.

I also claim the arrangement of the devices, or the equivalent thereof, for introducing grain into a conveying pipe or passage, substantially as shown in figs. 3 and 4, and for the purpose herein specified.

S. W. WOOD.

Witnesses:
J. S. BROWN,
THOS. T. PARKER.